United States Patent [19]

Sakagami et al.

[11] Patent Number: 5,089,550
[45] Date of Patent: Feb. 18, 1992

[54] BLOCK COPOLYMER COMPOSITION

[75] Inventors: Toshinori Sakagami; Yasuo Toyama; Hisaharu Ito; Takumi Miyachi, all of Tokyo, Japan

[73] Assignee: Shell Internationale Research Maatschappij B.V., Netherlands

[21] Appl. No.: 427,090

[22] PCT Filed: Mar. 4, 1988

[86] PCT No.: PCT/EP88/00176

§ 371 Date: Oct. 2, 1989

§ 102(e) Date: Oct. 2, 1989

[87] PCT Pub. No.: WO89/08128

PCT Pub. Date: Sep. 8, 1989

[51] Int. Cl.$^5$ .................. C08F 297/04; C08L 53/02; C08L 93/04

[52] U.S. Cl. ................... 525/314; 525/98; 525/250; 525/271; 524/764

[58] Field of Search .................. 525/98, 314

[56] References Cited

U.S. PATENT DOCUMENTS 4,792,584 12/1988 Shiraki et al. .................. 525/98
4,822,653 4/1989 Kauffman et al. .................. 525/98
4,892,903 1/1990 Himes .................. 525/98

*Primary Examiner*—Melvyn I. Marquis
*Assistant Examiner*—Vasu S. Jagannathan

[57] ABSTRACT

A block copolymer composition comprising

40–85% by weight of a block copolymer $A_1-B_1$ from an aromatic vinyl compound and a conjugated diene, respectively, $A_1$ being <20% by weight of $(A_1+B_1)$, $A_1$ and $B_1$ having a molecular weight >12,000 and >150,000, respectively, and 15–60% by weight of a block copolymer $A_2-B_2-A_3$ from an aromatic vinyl compound, a conjugated diene and aromatic vinyl compound, respectively, $A_2+A_3$ being >20% by weight of $A_2+B_2+A_3$, $A_2$ and $A_3$ having a molecular weight >12,000 and (molecular weight of $B_2$)≦(molecular weight of $B_1$)/1.5. an adhesive composition comprising 100 parts by weight (pbw) of said block copolymer composition, 20–300 pbw of a tackifying resin, and 0–200 pbw of a softener, and a process for the preparation of said adhesive composition by mixing the components in question.

7 Claims, No Drawings

BLOCK COPOLYMER COMPOSITION

The invention relates to a block copolymer composition, to an adhesive composition containing said block copolymer composition and to a process for the preparation of said adhesive composition.

Straight-chain block copolymers made up of an aromatic vinyl compound and a conjugated diene are known in the art of anionic polymerization. They have been described, for instance, in Japanese patent specifications 40-23798 and 46-32415. However, when the block copolymers obtained by the methods described herein are used as tackifiers, the following two problems are encountered.

1) The adhesive properties on rough surfaces such as board and veneer board are insufficient and when products with adhesive properties are affixed to such surfaces and left there for a considerable length of time, the affixed products themselves will gradually peel off owing to shrinkage and outside forces.

2) Affixed products with adhesive properties are easily ripped off by shocks from outside.

Various attempts have already been made to solve these problems; for instance in Japanese Patent Specifications 60-221475, 60-223879, 60-223880, 60-226579, pressure-responsive adhesive compositions are described which are made up of block copolymers $S_1-I_1$ and $S_2-I_2-S_3$ ($S_1$, $S_2$, $S_3$ being styrene block polymers or block polymers derived from a styrene homolog, and $I_1$, $I_2$ being isoprene block polymers or block polymers derived from an isoprene homolog).

However, although the problems described hereinbefore under 1) and 2) are solved for near ambient temperatures, the bonding force of these pressure responsive adhesive compositions at low and high temperatures is still unsatisfactory. The problem lies in the absence of balance between low temperature tack and high temperature retention force.

A block copolymer composition has now been found which when used as adhesive, makes hot melt moulded adhesive compositions with an excellent balance between low temperature tack and high temperature bonding force.

Accordingly, the invention provides a block copolymer composition comprising:

in the range of from 40 to 85% by weight of a block copolymer of the general formula (I)

$$A_1-B_1 \quad (I)$$

wherein $A_1$ and $B_1$ represent a polymer block of an aromatic vinyl compound and a conjugated diene respectively, which block copolymer has a content of the polymer block of the aromatic vinyl compound $A_1$ of less than 20% by weight of the total weight of $A_1$ and $B_1$, and $A_1$ and $B_1$ have a molecular weight of more than 12,000 and more than 150,000, respectively; and in the range of from 15 to 60% by weight of a block copolymer of the general formula (II)

$$A_2-B_2-A_3 \quad (II)$$

wherein $A_2$ and $A_3$ each represent a polymer block of an aromatic vinyl compound and $B_2$ a polymer block of a conjugated diene, which block copolymer has a total content of the polymer blocks of the aromatic vinyl compound $A_2$ and $A_3$ of more than 20% by weight of the total weight of $A_2$, $B_2$ and $A_3$ and $A_2$ and $A_3$ each have a molecular weight of higher than 12,000, and (molecular weight of $B_2$)≦(molecular weight of $B_1$)/1.5.

When the content of the polymer block of the aromatic vinyl compound is larger than 20% by weight, or the molecular weight of $B_1$ is lower than 150,000, there will be insufficient low temperature tack, and when the molecular weight of $A_1$ is lower than 12,000, the high temperature retention force will be insufficient.

In the block copolymer of the general formula I, the content of the polymer block of the aromatic vinyl compound $A_1$ on the total amount of $A_1$ and $B_1$ is preferably more than 1% by weight, more preferably in the range of from 4 to 18% by weight, still more preferably 5 to 15% by weight; the molecular weight of $A_1$ is preferably in the range of from 12,000 to 55,000, the molecular weight of $B_1$ is preferably in the range of from 150,000 to 300,000.

In the block copolymer of the general formula II, the total content of the polymer blocks of the aromatic vinyl compounds $A_2$ and $A_3$ on the total amount of $A_2$, $B_2$ and $A_3$ is preferably in the range of from 25 to 80% by weight, still more preferably 30 to 80% by weight, and $A_2$ and $A_3$ are each preferably in the range of from 10 to 50% by weight of the total of $A_2-B_2-A_3$, more preferably 12 to 40% by weight. The molecular weights of $A_2$ and $A_3$ are preferably in the range of from 12,000 to 55,000. When the total content of the polymer blocks of aromatic vinyl compound is not more than 20% by weight, or the molecular weight of $A_2$ is not higher than 12,000, or the range (molecular weight of $B_2$)≦(molecular weight of $B_1$)/1.5 is not satisfied, the high temperature bonding force will be insufficient.

When the weight ratio of the two block copolymers lies outside the range 40 to 85% by weight for the block copolymer of the general formula I and 15 to 60% by weight for the block copolymer of the general formula II, the balance between low temperature tack and high temperature bonding force will not be upheld. The amounts in which the two block copolymers are blended are preferably in the range of from 45 to 80% by weight of the block copolymer of the general formula I and in the range of from 20 to 55% by weight of the block copolymer of the general formula II.

The afore-mentioned block copolymers of the general formulae I and II can be obtained by anionic polymerization using an alkyl-lithium initiator. To an inert solvent chosen from hydrocarbons, such as benzene, cyclohexane, n-hexane, an organic lithium compound, such as n-butyllithium, sec-butyllithium is added and then, while an aromatic vinyl monomer, such as styrene, α-methylstyrene, p-methylstyrene, m-methylstyrene, o-methylstyrene, p-tert-butylstyrene, a dimethylstyrene, 1- or 2-vinylnaphthalene, and a conjugated diene monomer, such as isoprene, butadiene, piperylene, are gradually added, the blocks are formed, generally at a temperature in the range of from 30° to 120° C., preferably 50° to 80° C. Very good results have been obtained with styrene and isoprene.

The copolymer of the general formula II may be obtained by allowing the copolymer of the general formula I to be coupled by using a coupling agent, such as a divinyl aromatic compound, for instance divinylbenzene, a dihalogenated hydrocarbon, for instance dibromomethane, dibromoethane, dibromopropane, methylenechloride, dichloroethane, dichloropropane, dichlorobutane, a dialkyl dihalogenated silicon, for instance dimethyldichlorosilane, diethyldichlorosilane, dimethylsilicondibromide, diethylsilicondichloride, diethylsilicon dibromide.

The invention further provides an adhesive composition comprising
 a) 100 parts by weight of a block copolymer composition according to the present invention,
 b) in the range of from 20 to 300 parts by weight of a tackifying resin, and
 c) in the range of from 0 to 200 parts by weight of a softener.

Tackifying resins that may be added to the afore-mentioned block copolymer compositions, are resins, terpene resins, denaturated terpene resins, cumarone inden resins, petroleum resins, styrene resins, of which one or more may be blended in.

The amount of the said resins added lies preferably in the range of from 50 to 200 parts by weight (pbw), on 100 pbw of the afore-mentioned copolymers of the general formulae I and II.

A usually employed softener, such as a process oil, for instance paraffinic process oil, naphthenic process oil, aromatic process oil, may be used as softener, and apart from these, a liquid tackifying resin may also be used for the purpose.

The amount of softener used is preferably in the range of from 20 to 150 pbw.

Apart from the above additives, stabilizers, such as anti-oxidants, ultraviolet absorbers, inorganic fillers, such as calcium carbonate, talc, clay, titania, silica, magnesium carbonate, carbon black, and colouring agents, may be added to the composition of the present invention, if required.

As long as their characteristics as hot melt tackifiers are not lost, the compositions of the present invention may be mixed with one or a mixture of two or more other elastomers, for instance natural rubber, polyisoprene rubber, polybutadiene rubber, styrene butadiene rubber, high styrene rubber, chloroprene rubber, EPT, EPR, acryl rubber, polyisoprene isobutylene rubber, and thermoplastic plastics, for instance, 1,2-polybutadiene, poly-(1-butene), polyethylene, ethylene vinyl acetate copolymer, ethylene-ethyl acrylate copolymer, atactic polypropylene, an ionomer, ethylene resin.

The invention also provides a process for the preparation of an adhesive composition according to the present invention which process comprises mixing
 a) 100 parts by weight of a block copolymer composition according to the present invention,
 b) in the range of from 20 to 300 parts by weight of a tackifying resin; and
 c) in the range of from 0 to 200 parts by weight of a softener.

The afore-mentioned components are placed in, for instance, a normal mixing vessel or a sealed kneader and mixed with heating, if required in a nitrogen atmosphere, to prepare the block copolymer compositions or adhesive compositions according to the invention.

The adhesive compositions according to the invention thus prepared when mixed by heat dissolution and applied direct to form a tacky layer, are highly efficient economically. They may, however, also be mixed and applied with the aid of a usual solvent or by emulsification.

Since the compositions of the invention with adhesive properties thus prepared can be formed into a tacky layer by applying them to a substrate, they can be efficiently used for all kinds of, for example, adhesive tapes, labels, linings for fixing all kinds of light weight plastic mould goods and linings for fixing carperts and also as materials for adhesive layers for adhesive tapes and labels used for cold storage foods and in cold surroundings.

In addition to these uses, the block copolymer compositions of the present invention cover a wide range of uses, of which injection moulded goods, such as foot wear and containers, flow moulded goods, such as toys and household appliances, compression moulded goods, such as packings, sheets, plates, may be given as examples. The block copolymer compositions of the present invention may also be blended with other rubbers, such as SBR and NBR and plastics, such as polystyrene, to improve their properties. For instance, their service in rubber is as improvers of crepe sponge and in plastics as shock resistance improvers for widely used polystyrenes. The block copolymers of the present invention may also be blended with asphalt to improve the cold resistance of the asphalt.

The following Examples further illustrate the invention. The Examples are according to the invention, the Comparative Experiments are not.

The molecular weights of the styrene part and the polyisoprene part were found with the aid of the following method.

1. Polystyrene-Polyisoprene Block Copolymer

From the data obtained from gel permeation chromatography (GPC), the peak molecular weight in the molecular weight distribution curve was found, and the molecular weights of the styrene part and of the polyisoprene part were computed with the aid of the following formulae:

$$(PS\text{-}M) = (P\text{-}M) \times \text{styrene content } (\% \text{ w})$$

$$(PI\text{-}M) = (P\text{-}M) - (PS\text{-}M)$$

wherein:
 (PS-M) = polystyrene molecular weight
 (P-M) = peak molecular weight
 (PI-M) = polyisoprene molecular weight The percentage by weight of styrene was found from the infrared spectrum.

2. Polystyrene-Polyisoprene-Polystyrene Linear Block Copolymer $$PS\text{-}M = (P\text{-}M) \times \text{amount of styrene}/2$$

$$PI\text{-}M = (P\text{-}M) - (PS\text{-}M) \times 2$$

Preparation of Polystyrene-Polyisoprene Block Copolymer (S-I) (1)

An autoclave fitted with cleaned, dried stirrer and jacket was charged under nitrogen atmosphere with 1600 g of a liquid 9/1 cyclohexane/n-pentane mixture and 0.12 g tetrahydrofuran; then the contents were brought to 60° C.

After addition of a hexane solution containing 0.5 g of n-butyllithium and 29.6 g of styrene, the mixture was polymerized for 60 minutes. The styrene polymerized quantitatively. Next, 370.4 g of isoprene was added and polymerized for 60 minutes. The isoprene polymerized quantitatively.

In the course of the polymerization, the temperature was kept at 60°-70° C. After termination of the polymerization, 2,6-di-tert-butyl-p-cresol was added to the polymer solution, and the cyclohexane/n-pentane was removed by heat to afford the block copolymer.

The molecular weights of the individual parts of the polystyrene-polyisoprene block copolymer (1) obtained were determined; the molecular weight of the polystyrene part was found to be 16,000 ($A_1$), and of the polyisoprene part 200,000 ($B_1$).

Preparation of Polystyrene-Polyisoprene Block Copolymer (S-I) (2)

This block copolymer was obtained in the same way as the polystyrene-polyisoprene block copolymer (1) described hereinbefore, except that the amount of styrene added was 41.2 g and the amount of isoprene added was 358.8 g.

The molecular weights of the individual parts of the polystyrene-polyisoprene block copolymer (2) obtained were determined; the molecular weight of the polystyrene part was found to be 16,000 ($A_1$), and of the polyisoprene part 155,000 ($B_1$).

Preparation of Polystyrene-Polyisoprene Block Copolymer (S-I) (3)

This block copolymer was obtained in the same way as the polystyrene-polyisoprene block copolymer (1) described hereinbefore, except that the amount of styrene added was 20.4 g and the amount of isoprene added was 379.6 g.

The molecular weights of the individual parts of the polystyrene-polyisoprene block copolymer (3) obtained were determined; the molecular weight of the polystyrene part was found to be 16,000 ($A_1$), and of the polyisoprene part 300,000 ($B_1$).

Preparation of Polystyrene-Polyisoprene Block Copolymer (S-I) (4)

This block copolymer was obtained in the same way as the polystyrene-polyisoprene block copolymer (1) described hereinbefore, except that the amount of styrene added was 55.2 g and the amount of isoprene added was 344.8 g.

The molecular weights of the individual parts of the polystyrene-polyisoprene block copolymer (4) obtained were determined; the molecular weight of the polystyrene part was found to be 16,000 ($A_1$), and of the polyisoprene part 100,000 ($B_1$).

Preparation of Polystyrene-Polyisoprene Block Copolymers (S-I) (5)-(7)

The polymerizations were carried out in accordance with that of (S-I) (1), with varying amounts of styrene. The results are listed in Table 1.

Preparation of Polystyrene-Polyisoprene-Polystyrene Linear Block Copolymer (S-I-S) (1)

The same autoclave as described hereinbefore was charged with 1600 g of a liquid 9/1 cyclohexane/n-pentane mixture and 0.12 g of tetrahydrofuran; the temperature was brought to 60° C.

After addition of a hexane solution containing 0.5 g of n-butyllithium, and subsequently of 48.4 g of styrene, the mixture was polymerized for 20 minutes. The styrene polymerized quantitatively. Next, 303.2 g of isoprene was added and polymerized for 20 minutes. The isoprene polymerized quantitatively. Finally, 48.4 g of styrene was added and polymerized for 20 minutes. The styrene polymerized quantitatively.

In the course of the polymerization, the temperature was kept at 60°-70° C. After termination of the polymerization, 2,6-di-tert-butyl-p-cresol was added to the polymer solution; then the cyclohexane/n-pentane was removed by heat to afford the block copolymer.

The molecular weights of the individual parts of the polystyrene-polyisoprene-polystyrene linear block copolymer (S-I-S) (1) obtained were determined; the molecular weight of the first polystyrene part was found to be 16,000 ($A_2$), the molecular weight of the polyisoprene part was 100,000 ($B_2$) and the molecular weight of the second polystyrene part was found to be 16,000 ($A_3$)

Preparation of Polystyrene-Polyisoprene-Polystyrene Linear Block Copolymer (S-I-S) (2)

This block copolymer was obtained in the same way as the polystyrene-polyisoprene-polystyrene linear block copolymer (1) described hereinbefore, except that the amounts of styrene added were 62.8 g each and the amount of isoprene added was 274.4 g.

The molecular weights of the individual parts of the polystyrene-polyisoprene-polystyrene linear block copolymer (S-I-S) (2) obtained were determined; the molecular weight of the first polystyrene part was found to be 16,000 ($A_2$), the molecular weight of the polyisoprene part was 70,000 ($B_2$) and the molecular weight of the second polystyrene part was found to be 16,000 ($A_3$)

Preparation of Polystyrene-Polyisoprene-Polystyrene Linear Block Copolymer (S-I-S) (3)

This block copolymer was obtained in the same way as the polystyrene-polyisoprene-polystyrene linear block copolymer (1) described hereinbefore, except that the amounts of styrene added were each 27.6 g and the amount of isoprene added was 344.8 g.

The molecular weights of the individual parts of the polystyrene-polyisoprene-polystyrene linear block copolymer (S-I-S) (3) obtained were determined; the molecular weight of the first polystyrene part was found to be 16,000 ($A_2$), the molecular weight of the polyisoprene part was 200,000 ($B_2$) and the molecular weight of the second polystyrene part was found to be 16,000 ($A_3$)

Preparation of Polystyrene-Polyisoprene-Polystyrene Linear Block Copolymer (S-I-S) (4)

The polymerizations were carried out in accordance with that of (S-I-S) (1), with varying amounts of styrene. The results are listed in Table 1.

EXAMPLES 1-7

Blends of the block copolymers having the compositions shown in Table 1 were charged to a rubber mill which was heated to 130° C. and mixed for 30 minutes to form a uniform smoothly flowing adhesive composition.

This adhesive composition was removed under melt conditions and with an applicator it was coated 35 μm thick onto a polyester film to prepare adhesive tape samples. Tack (10° C.), bonding force (23° C.) and retention force (40° C.) of these adhesive tapes were determined and listed in Table 1.

The determination of the above characteristics was carried out with the aid of the following methods.

Tack; PSTC #6 Rolling Ball Tack Method

Steel spheres with a 1.11 cm diameter were rolled over a plate sloping at an angle of 21.5° and the distances at which they stopped rolling over a horizontal plate pasted with the tape samples were measured. Determination took place at an environmental temperature of 10° C., and a forward run of 15 cm.

Bonding Force; JIS-Z-1522 180° C. Friction Test

An adhesive tape sample was cut into 10 mm wide strips, stuck onto a SUS 304 plate and subjected to friction at a pulling speed of 300 mm/min.

Retention Force; JIS-Z-1524

An adhesive tape sample was cut into 15 mm wide strips and stuck to an SUS 304 plate over a fixed area of 15 mm×25 mm; a load of 1.2 kg was suspended from one side of the tape and the time it took for the plasted area to peel off and fall was recorded. The environmental temperature was 40° C.

COMPARATIVE EXPERIMENT 1

Polystyrene-polyisoprene blockcopolymer (S-I) (4) and polystyrene-polyisoprene-polystyrene linear block polymer (S-I-S) (3) were mixed in the compounding ratios given in Table 1, and adhesive tape samples were prepared in the same way as described in Examples 1-4, and their properties were determined; the bonding force (23° C.) and tack (10° C.) were sufficient but the retention force (40° C.) was inferior.

COMPARATIVE EXPERIMENT 2

Polystyrene-polyisoprene blockcopolymer (S-I) (1) and polystyrene-polyisoprene-polystyrene linear block polymer (S-I-S) (1) were mixed in the compounding ratios given in Table 1, and adhesive tape samples were prepared in the same way as described in Examples 1-4, and their properties were determined; the retention force (40° C.) and the bonding force (23° C.) were sufficient, but the tack (10° C.) was inferior.

COMPARATIVE EXPERIMENT 3

Polystyrene-polyisoprene blockcopolymer (S-I) (4) and polystyrene-polyisoprene-polystyrene linear block polymer (S-I-S) (1) were mixed in the compounding ratios given in Table 1, and adhesive tape samples were prepared in the same way as described in Examples 1-4, and their properties were determined; the bonding force (23° C.) and the retention force (40° C.) were sufficient, but the tack (10° C.) was inferior.

COMPARATIVE EXPERIMENTS 4-7

The compositions of these Experiments, as those of Comparative Experiments 1-3, differ in essential elements of preparation from those of the present invention; in none of these, a very good balance of adhesive properties was obtained.

TABLE 1

| Block copolymer I | | | | | Block copolymer II | | | | | | |
|---|---|---|---|---|---|---|---|---|---|---|---|
| | $A_1$ | | $B_1$ | | | $A_2$ | | $B_2$ | | $A_3$ | |
| No. | content | mol. wt | content | mol. wt | No. | content | mol. wt | content | mol. wt | content | mol. wt |
| 1 | 7.4% | 16,000 | 92.6% | 200,000 | | | | | | | |
| 2 | 10.3% | " | 89.7% | 155,000 | | | | | | | |
| 3 | 5.1% | " | 94.9% | 300,000 | | | | | | | |
| 4 | 13.8% | " | 86.3% | 100,000 | | | | | | | |
| 5 | 13.0% | 30,000 | 87.0% | 200,000 | | | | | | | |
| 6 | 23.1% | 60,000 | 76.9% | 200,000 | | | | | | | |
| 7 | 3.8% | 8,000 | 96.2% | 200,000 | | | | | | | |
| | | | | | 1 | 12.1% | 16,000 | 75.8% | 100,000 | 12.1% | 16,000 |
| | | | | | 2 | 15.7% | " | 68.6% | 70,000 | 15.7% | " |
| | | | | | 3 | 6.9% | " | 86.2% | 200,000 | 6.7% | " |
| | | | | | 4 | 18.8% | 30,000 | 62.4% | 100,000 | 18.8% | 30,000 |

| | Examples | | | | | | | Comparative Experiments | | | | | | |
|---|---|---|---|---|---|---|---|---|---|---|---|---|---|---|
| No. | 1 | 2 | 3 | 4 | 5 | 6 | 7 | 1 | 2 | 3 | 4 | 5 | 6 | 7 |
| 1. | 70 | 50 | | | | 70 | 70 | | 90 | | | 70 | | |
| 2. | | | 70 | | | | | | | | | | | |
| 3. | | | | 70 | | | | | | | | | | |
| 4. | | | | | | | | 70 | | 70 | | | | 70 |
| 5. | | | | | 70 | | | | | | | | | |
| 6. | | | | | | | | | | | | | | |
| 7. | | | | | | | | | | | | | 70 | |
| 1. | 30 | 50 | | 30 | 30 | | | | 10 | 70 | | 30 | 30 | |
| 2. | | | 30 | | | | | | | 30 | | | | |
| 3. | | | | | | | | 30 | | | | | | |
| 4. | | | | | | 30 | 30 | | | | 30 | | | 30 |
| $B_1/B_2 \times 1.5$ | 1.33 | 1.33 | 1.33 | 2.00 | 1.33 | 1.33 | 1.90 | 1.33 | 1.33 | 0.33 | 1.33 | 1.33 | 0.67 | 0.67 |
| Petroleum resin (1) | 120 | 120 | 120 | 120 | 120 | 120 | 120 | 120 | 120 | 120 | 120 | 120 | 120 | 120 |
| Process oil (2) | 20 | 20 | 20 | 20 | 20 | | | | 20 | 20 | 20 | | | |
| Age resistor (3) | 4 | 4 | 4 | 4 | 4 | 4 | 4 | 4 | 4 | 4 | 4 | 4 | 4 | 4 |
| tack 10° C. cm | 2 | 5 | 6 | 2 | 10 | 8 | 3 | 2 | 21 | 19 | >25 | 2 | 2 | 20 |
| bonding force 23° C. g/cm | 1060 | 1060 | 1080 | 1000 | 1140 | 1100 | 1060 | 940 | 1020 | 1080 | 1220 | 860 | 860 | 1060 |
| retention force, 40° C. | 104 | 110 | 122 | 88 | 165 | 140 | 110 | 48 | 112 | 88 | 190 | 28 | 55 | 110 |

(1) Exxon, Escoret 1310
(2) , Gayana process oil NM28
(3) , Sansera-BZ prepared in the same way as described in Examples 1-4, and their properties were determined; the bonding force (23° C.) and tack (10° C.) were sufficient but the retention force (40° C.) was inferior.

The use of the block copolymer compositions of the present invention in tackifiers results in hot melt adhesive compositions having an excellent balance between low temperature tack and high temperature retention force. Consequently, it is possible to prepare, for instance, adhesive tape which has these excellent adhesive properties, and thus a very high industrial value.

We claim:

1. A block copolymer composition comprising
   (1) in the range of from 50 to 85% by weight of a block copolymer of the formula (I)

$$A_1-B_1 \qquad (I)$$

wherein $A_1$ and $B_1$ represent a polymer block of an aromatic vinyl compound and a conjugated diene, respectively, said block copolymer (I) containing said polymer block of the aromatic vinyl compound $A_1$ in an amount of less than 20% by weight of the total weight of $A_1$ and $B_1$, and said $A_1$ and $B_1$ having a weight average molecular weight of greater than 12,000 and greater than 150,000, respectively; and
   (2) in the range of from 15 to 50% by weight of a block copolymer of the formula (II)

$$A_2-B_2-A_3 \qquad (II)$$

wherein $A_2$ and $A_3$ each represent a polymer block of an aromatic vinyl compound and $B_2$ represents a polymer block of a conjugated diene, which block copolymer (II) has a total content of the polymer blocks of the aromatic vinyl compound $A_2$ and $A_3$ of more than 20% by weight of the total weight of $A_2$, $B_2$ and $A_3$, with $A_2$ and $A_3$ each having a weight average molecular weight of greater than 12,000, and wherein (weight average molecular weight of $B_2$)$\leq$(weight average molecular weight of $B_1$)/1.5.

2. A block copolymer composition as claimed in claim 1 in which the content of the polymer block of the aromatic vinyl compound $A_1$ in the block copolymer of the formula I is in the range of from 4 to 18% by weight of the total weight of $A_1$ and $B_1$.

3. A block copolymer composition as claimed in claim 1 or 2 in which the molecular weight average weights of the polymer block of the aromatic vinyl compound $A_1$ and of the conjugated diene $B_1$ are in the range of from 12,000 to 55,000 and of from 150,000 to 300,000, respectively.

4. A block copolymer composition as claimed in claim 1 in which the total content of the polymer blocks of the aromatic vinyl compounds $A_2$ and $A_3$ in the block copolymer of the formula II is in the range of from 25 to 80% by weight of the total weight of $A_2$, $B_2$ and $A_3$.

5. A block copolymer composition as claimed in claim 1 in which the polymer blocks of the aromatic vinyl compounds $A_2$ and $A_3$ have a weight average molecular weight in the range of from 12,000 to 55,000.

6. A block copolymer composition as claimed in claim 1 in which $A_1$ in the formula I and $A_2$ and $A_3$ in the formula II each represent a polymer block of styrene.

7. A block copolymer composition as claimed in claim 1 in which $B_1$ in the general formula I and $B_2$ in the general formula II each represent a polymer block of isoprene.

* * * * *